(12) United States Patent
Lee

(10) Patent No.: US 8,139,096 B2
(45) Date of Patent: Mar. 20, 2012

(54) MULTI-COLOR IMAGE FORMING APPARATUS AND METHOD OF CONTROLLING THE SAME

(75) Inventor: Sang Hyong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 903 days.

(21) Appl. No.: 12/125,108

(22) Filed: May 22, 2008

(65) Prior Publication Data

US 2009/0046310 A1  Feb. 19, 2009

(30) Foreign Application Priority Data

Aug. 14, 2007 (KR) .................. 10-2007-0081957

(51) Int. Cl.
*B41J 2/435* (2006.01)
*B41J 2/47* (2006.01)
(52) U.S. Cl. .................. 347/234; 347/229; 347/248
(58) Field of Classification Search .................. 347/116, 347/228–230, 232–235, 241, 248–250, 256
See application file for complete search history.

(56) References Cited

U.S. PATENT DOCUMENTS 5,786,594 A * 7/1998 Ito et al. .................. 250/236
6,480,221 B1 * 11/2002 Lund et al. .................. 347/248
6,785,011 B1 * 8/2004 Cook .................. 358/1.1
6,919,978 B2 * 7/2005 Kudo .................. 359/204.1

FOREIGN PATENT DOCUMENTS

JP  9-68673  3/1997

OTHER PUBLICATIONS

Korean Office Action issued Sep. 7, 2011 in KR Application No. 10-2007-0081957.

* cited by examiner

*Primary Examiner* — Hai C Pham
(74) *Attorney, Agent, or Firm* — Stanzione & Kim, LLP

(57) ABSTRACT

A multi-color image forming apparatus includes signal detecting units which are included in development units and detect horizontal synchronization signals, a correction unit to count pulse widths of the horizontal synchronization signals detected by the signal detecting units and correct timings of vertical offsets to be increased or decreased according to lengths of the pulse widths, and a video controller to output video data to scan multi-color images on surfaces of photosensitive drums according to the timings of the vertical offsets corrected by the correction unit. Even when any one of the laser scanning units and the development units is shifted from a reference position, the vertical offset is corrected such that the multi-color images printed on a recording medium are aligned in a vertical direction. Accordingly, preventing quality of the multi-color images from deteriorating is possible.

7 Claims, 16 Drawing Sheets

MULTI-COLOR IMAGE FORMING APPARATUS AND METHOD OF CONTROLLING THE SAME

CROSS-REFERENCE TO RELATED APPLICATIONS

This application claims priority under 35 U.S.C. §119(a) from Korean Patent Application No. 2007-81957, filed on Aug. 14, 2007 in the Korean Intellectual Property Office, the disclosure of which is incorporated herein in its entirety by reference.

BACKGROUND OF THE INVENTION

1. Field of the Invention

The present general inventive concept relates to a multi-color image forming apparatus and a method of controlling the same, to correct vertical offsets when alignment errors occur between laser scanning units and development units.

2. Description of the Related Art

In general, in an electrophotographic image forming apparatus, a laser scanning unit scans a laser beam, forms an electrostatic latent image on a photosensitive body, and transfers the electrostatic latent image onto a sheet of paper, thereby printing a desired image.

In a multi-color image forming apparatus, for the purpose of development, four toners of black (K), cyan (C), magenta (M) and yellow (Y) are used. A plurality of laser scanning units corresponding to the four toners are further included.

As illustrated in FIG. 1, the multi-color image forming apparatus includes a feeding unit 10, a plurality of laser scanning units 20K, 20C, 20M and 20Y, a plurality of development units 30K, 30C, 30M and 30Y, a plurality of photosensitive drums 31K, 31C, 31M and 31Y, a transfer unit 40, a fixing unit 50, and an ejection unit 60. The laser scanning units, the development units and the photosensitive drums are individually provided corresponding to respective colors.

When a print command is input to the multi-color image forming apparatus, multi-color images are respectively formed on the photosensitive drums 31K, 31C, 31M and 31Y by laser beams emitted from the laser scanning units 20K, 20C, 20M and 20Y. When the images are formed, a sheet of paper P passes between a sheet transporting belt 41 of the transfer unit 40 and the photosensitive drums 31K, 31C, 31M and 31Y. At this time, the multi-color images respectively formed on the photosensitive drums 31K, 31C, 31M and 31Y are transferred onto the sheet by transfer rollers corresponding thereto. The sheet on which the images are transferred passes through the fixing unit 50 to apply heat and pressure such that the images are fixed. Then, the sheet is ejected by the ejection unit 60.

As illustrated in FIG. 2, the laser scanning unit 20C to scan the cyan laser beam and the development unit 30C corresponding thereto face each other. The laser scanning unit 20C includes a polygon mirror 21C, a fθ lens 22C, a reflection member 23C, an optical sensor 24C and a focusing member 25C.

The laser beam emitted from a laser diode (not illustrated), which is included in the laser scanning unit 20C, is reflected from the polygon mirror 21C. At this time, the laser diode outputs a horizontal synchronization signal. The optical path of the horizontal synchronization signal is changed by the reflection member 23C. The horizontal synchronization signal focused by the focusing member 25C is applied to the optical sensor 24C. The optical sensor 24 detects the horizontal synchronization signal and supplies the detected horizontal synchronization signal to a signal processing block (not illustrated).

After the horizontal synchronization signal is output, the laser diode outputs a laser beam to print a cyan image. The laser beam is reflected from the polygon mirror 21C and is scanned onto the surface of the photosensitive drum 31C through the fθ lens 22C along a scanning direction Sd.

The multi-color image forming apparatus includes the plurality of development units corresponding to the plurality of laser scanning units corresponding to the respective colors.

As illustrated in FIG. 3, the color laser scanning units 20K, 20C, 20M and 20Y and the photosensitive drums 31K, 31C, 31M and 31Y of the plurality of development units are respectively provided in correspondence with reference positions Pr1, Pr2, Pr3 and Pr4.

When the plurality of laser scanning units are included in correspondence with the toner colors, the scanning positions of the laser beams emitted from the laser scanning units should be aligned corresponding to the respective colors, in order to output a high-quality image.

The scanning positions of the laser beams should be respectively aligned to the reference positions in horizontal and vertical directions. For alignment in the vertical direction (sheet transporting direction), vertical offsets are respectively set corresponding to the respective colors, as illustrated in FIG. 4. The multi-color laser beams are scanned using the respective vertical offsets. For example, as illustrated in FIG. 5, when outputting four rectangular images Ki, Ci, Mi and Yi of black, cyan, magenta and yellow, which are positioned at a predetermined position of a printing medium P1 in a vertical direction, a black vertical offset Voffset[K], a cyan vertical offset Voffset[C], a magenta vertical offset Voffset[M] and a yellow vertical offset Voffset[Y] respectively having timings corresponding to distance differences of the plurality of development units are individually applied. The vertical offsets corresponding to the respective colors are previously set.

However, the laser scanning units and the development units may be positioned to be shifted in the vertical direction at a time of installation thereof. Although the laser scanning units and the development units are accurately positioned, the units may be moved in the vertical direction due to a vibration of motors which drive the polygon mirrors to deflect the laser beams and thus the relative positions between the laser scanning units and the development units may be shifted. That is, the photosensitive drums are positioned to be shifted from the reference positions Pr1, Pr2, Pr3 and Pr4.

Accordingly, the scanning positions of the laser beams which are respectively scanned onto the photosensitive drums in the vertical direction may be changed.

In order to solve such a problem, an auto color registration method of printing a specific test pattern on a printing medium was used. The positional differences of the colors in the vertical direction were checked by a result of performing the auto color registration method and the vertical offsets were corrected in order to compensate for the positional differences.

This method is troublesome because the auto color registration operation should be performed whenever a printing operation is performed for a predetermined period. In addition, since the test pattern should be printed on the sheet, the printing medium or an ink is wastefully used. Since an operation to scan the test pattern and analyze the test pattern should be performed, the load of signal processing necessary to analyze the test pattern becomes large.

As described above, when the laser scanning units and the development units disposed in the multi-color image forming apparatus are placed to be shifted from the reference positions, the scanning positions of the multi-color laser beams are changed and thus the quality of the multi-color images printed on printing mediums deteriorates.

When the auto color registration method is used in order to correct an alignment error in the vertical direction, a separate test printing operation is required regardless of an actual printing operation and thus the processing load is increased.

SUMMARY OF THE INVENTION

The general inventive concept provides correcting a vertical offset so as to correct an alignment error in a vertical direction, without performing a separate printing operation to correct the alignment error, when a relative position between a laser scanning unit and a development unit is changed.

The present general inventive concept also provides correcting vertical offsets according to pulse widths of horizontal synchronization signals detected by signal detecting units provided in development units.

The present general inventive concept also provides, even when any one of laser scanning units and development units is shifted from a reference position and an alignment error occurs in a vertical direction, printing a multi-color image after the alignment error is immediately corrected, and thus, preventing image quality from deteriorating.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a multi-color image forming apparatus including a plurality of laser scanning units to respectively output synchronization signals, by colors, a plurality of development units which are provided in correspondence with the plurality of laser scanning units and respectively include synchronization signal detecting units to detect the synchronization signals, a correction unit to correct predetermined vertical offsets according to pulse widths of the synchronization signals detected by the synchronization signal detecting units, and a video controller to output video data, by the colors, according to the vertical offsets corrected by the correction unit.

Each of the synchronization signal detecting units may respectively include an optical sensor and a focusing member.

If relative positions between the laser scanning units and the development units are shifted from reference positions, the focusing members may be not respectively positioned at scanning reference positions of the development units, and lengths of traces of the synchronization signals passing through the focusing members may be changed.

The optical sensors may respectively output the synchronization signals having the pulse widths corresponding to the lengths of the traces of the synchronization signals to the correction unit, and the correction unit may count lengths of the pulse widths of the synchronization signals and correct timings of the vertical offsets according to the lengths of the counted pulse widths.

The video controller may output the video data according to the corrected timings of the vertical offsets so as to align multi-color images to reference positions of a printing medium.

The focusing members may be disposed at one side of photosensitive drums in a line and have right triangular cross-sections, and heights of the right triangular cross-sections may be equal to or larger than diameters of the photosensitive drums.

The synchronization signals output from the plurality of laser scanning units may be horizontal synchronization signals for synchronization purposes before the scanning of a line.

The foregoing and/or other aspects and utilities of the general inventive concept may also be achieved by providing a multi-color image forming apparatus including a plurality of laser scanning units and a plurality of development units, the apparatus including focusing members which are provided in the development units in correspondence with the laser scanning units and focus horizontal synchronization signals output from the laser scanning units, optical sensors to vary pulse widths of the horizontal synchronization signals according to lengths of traces of the synchronization signals passing through the focusing members, a correction unit to correct timings of vertical offsets so as to correct alignment errors of the laser scanning units and the development units in a vertical direction according to the lengths of the pulse widths of the horizontal synchronization signals of the optical sensors, and a video controller to output video data to scan an image according to the timings of the vertical offsets corrected by the correction unit.

The foregoing and/or other aspects and utilities of the general inventive concept may also be achieved by providing a method of controlling a multi-color image forming apparatus including a plurality of laser scanning units and a plurality of development units in order to print a multi-color image, the method including detecting horizontal synchronization signals output from the plurality of laser scanning units, by colors, correcting vertical offsets according to pulse widths of the horizontal synchronization signals detected by signal detecting units included in the development units, and outputting video data to scan multi-color images on a basis of the corrected vertical offsets.

The correcting of the vertical offsets may include counting the pulse widths of the horizontal synchronization signals, comparing lengths of the counted pulse widths with a reference value, increasing the timings of the vertical offsets if the lengths of the counted pulse widths are larger than the reference value, and decreasing timings of the vertical offsets if the lengths of the counted pulse widths are smaller than the reference value.

The foregoing and/or other aspects and utilities of the general inventive concept may also be achieved by providing a multi-color image forming apparatus including a plurality of laser scanning units to output synchronization signals corresponding to respective colors, a plurality of development units corresponding to the laser scanning units to detect the synchronization signals, and correction unit to correct an alignment error in a vertical direction when a relative position between a respective laser scanning unit and a corresponding development unit is changed, wherein the correction unit corrects the alignment error without performing a separate printing operation to correct the alignment error.

The correction unit may correct the alignment error based on pulse widths of horizontal synchronization signals detected by the development units.

The correction unit may correct the alignment error in response to any one of the plurality of laser scanning units and the plurality of development units is shifted from a reference position and the alignment error occurs in a vertical direction.

The foregoing and/or other aspects and utilities of the general inventive concept may also be achieved by providing a method of correcting an alignment error of a multi-color image forming apparatus, the method including outputting synchronization signals corresponding to respective colors, detecting the synchronization signals, and correcting the alignment error in a vertical direction when a relative position between a respective laser scanning unit and a corresponding development unit is changed without performing a separate printing operation to correct the alignment error.

The foregoing and/or other aspects and utilities of the general inventive concept may also be achieved by providing a computer-readable recording medium having embodied thereon a computer program to execute a method, wherein the method includes outputting synchronization signals corresponding to respective colors, detecting the synchronization signals, and correcting an alignment error in a vertical direction when a relative position between a respective laser scanning unit and a corresponding development unit is changed without performing a separate printing operation to correct the alignment error.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
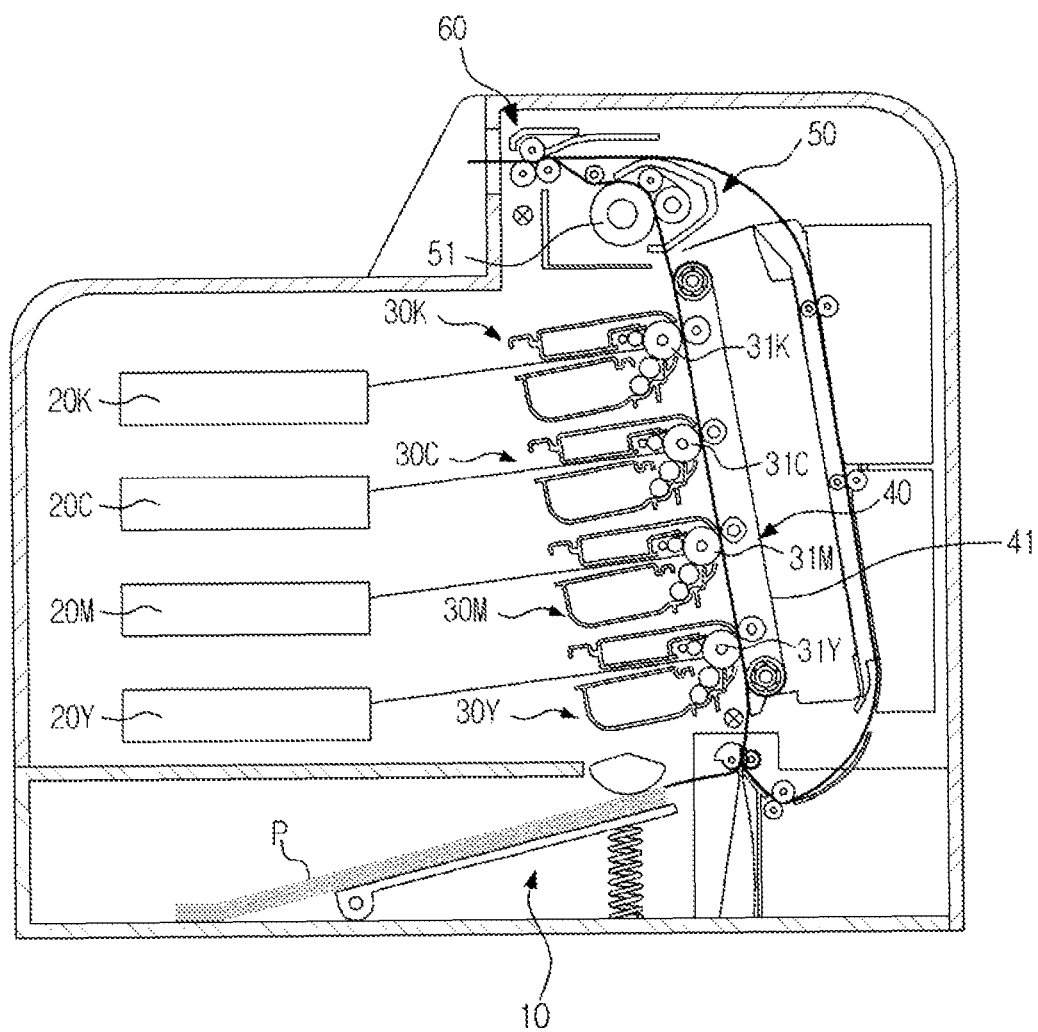
FIG. 1 is a cross-sectional view illustrating a configuration of a general multi-color image forming apparatus.
Figure 2:
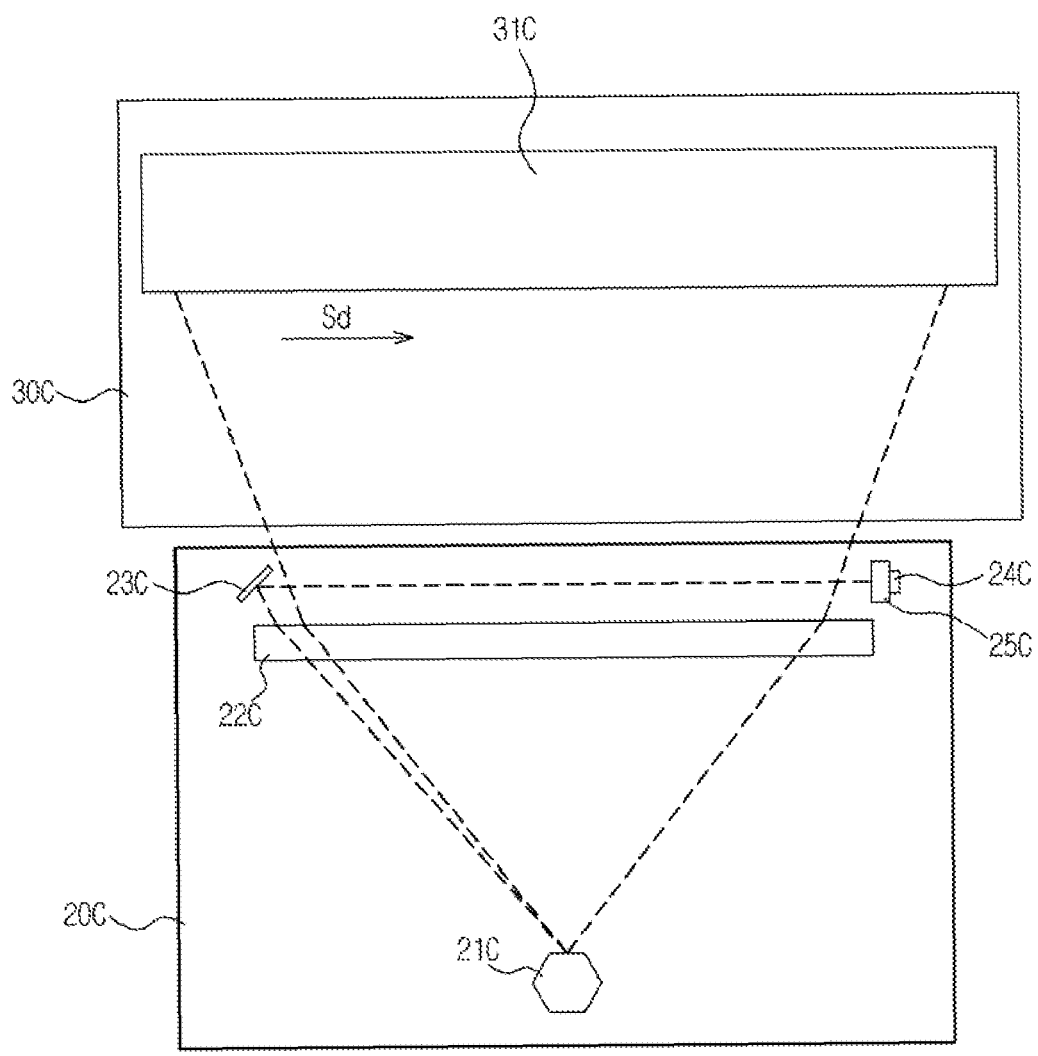
FIG. 2 is a view illustrating an operation to scan a laser beam output from a cyan laser scanning unit onto a photosensitive drum of a development unit.

Reference will now be made in detail to embodiments of the present general inventive concept, examples of which are illustrated in the accompanying drawings, wherein like reference numerals refer to the like elements throughout. The embodiments are described below to explain the present general inventive concept by referring to the figures.

Hereinafter, an inkjet image forming apparatus and a method of controlling the same according to an embodiment of the present general inventive concept will be described.

In the present embodiment, signal detecting units to receive horizontal synchronization signals output from laser scanning units are respectively disposed in development units, alignment errors in a vertical direction are checked according to pulse widths of the horizontal synchronization signals detected by the signal detecting units, and vertical offsets are corrected, by colors, according to the checked results.

The multi-color image forming apparatus according to the present embodiment may include a plurality of development units corresponding to a plurality of laser scanning units are disposed in the multi-color image forming apparatus.

Figure 6:
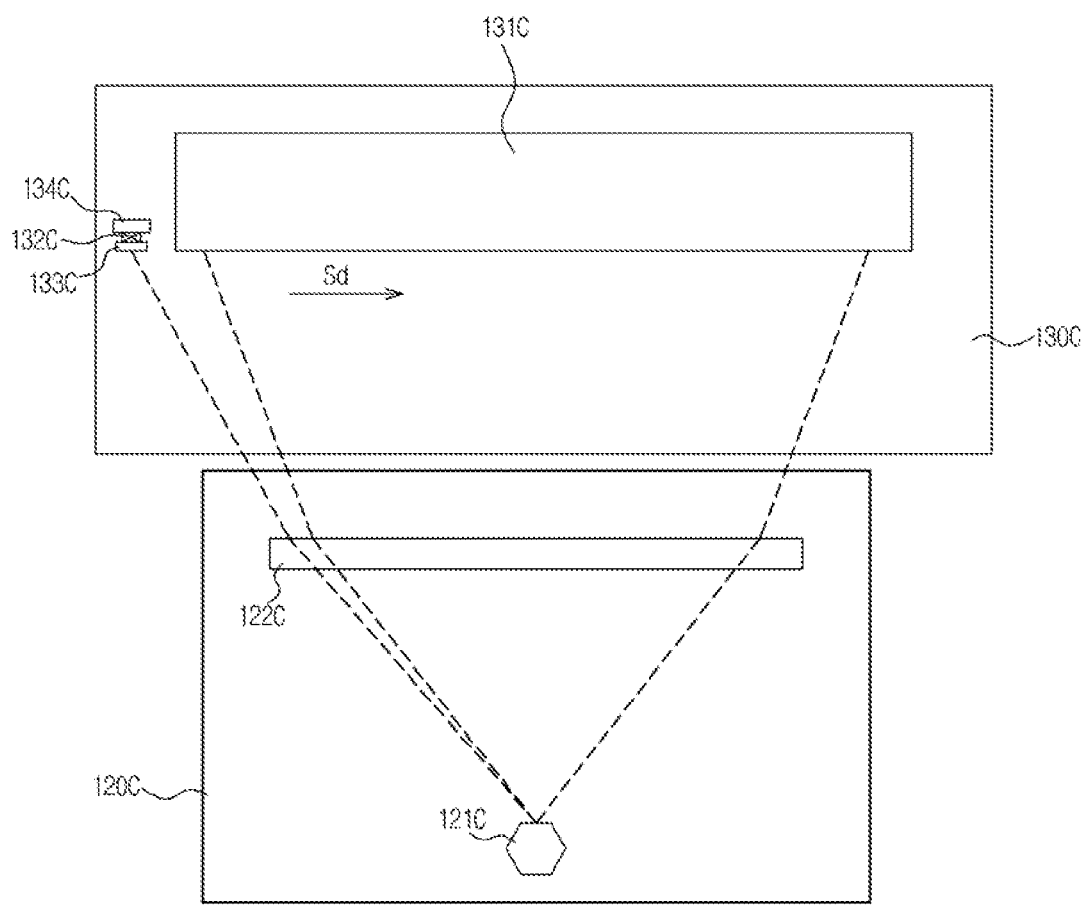
FIG. 6 is a view illustrating an operation to detect a horizontal synchronization signal output from a cyan laser scanning unit using a signal detecting unit included in a development unit and scan the laser beam onto a surface of a photosensitive drum, according to an embodiment of the present general inventive concept.

For example, as illustrated in FIG. 6, a cyan development unit 130C may be disposed in correspondence with a cyan laser scanning unit 120C. In the laser scanning unit 120C, a vertical synchronization signal generated by a laser diode (not illustrated) prior to scanning of a line is deflected by a polygon mirror 121C and is output to the development unit 130C through an fθ lens 122C.

At this time, the horizontal synchronization signal is detected by signal detecting units which include a focusing member 133C to focus the horizontal synchronization signal and an optical sensor 132C to detect the horizontal synchronization signal focused by the focusing member 133C and supply a predetermined pulse to a signal processing block (not illustrated), and are included in the development unit 130C and are positioned at one side of the photosensitive drum 131C. The focusing member 133C and the optical sensor 132C of the signal detecting units are fixed to a support 134C.

The laser beam emitted from the laser diode, which corresponds to one line, is deflected by the polygon mirror 121C and is scanned onto the photosensitive drum 131C through the fθ lens 122C along a scanning direction Sd.

The structure, in which the laser scanning unit and the development unit are disposed in correspondence with each other and the signal detecting unit to detect the horizontal synchronization signal generated by the laser scanning unit is provided in the development unit, is not limited to the cyan color and may be applied to all the colors in order to correct an alignment error in a vertical direction.

Figure 7:
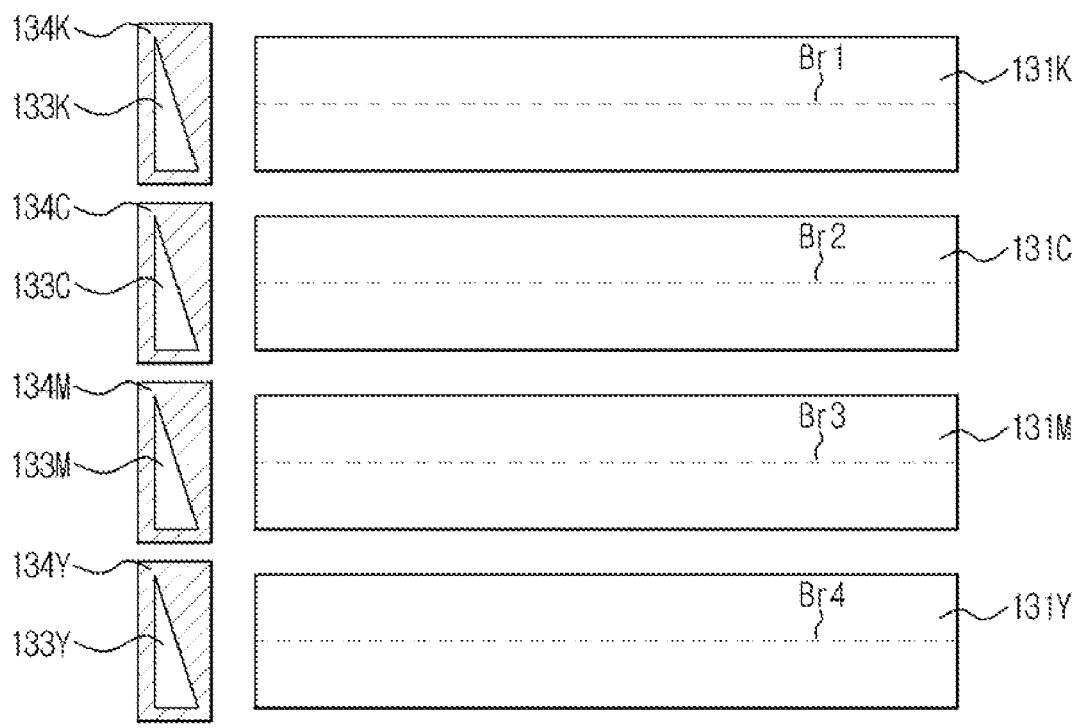
FIG. 7 is a view illustrating an example of a case where signal detecting units are disposed at one side of photosensitive drums of development units, according to an embodiment of the present general inventive concept.

As illustrated in FIG. 7, focusing members 133K, 133C, 133M, 133Y are disposed on supports 134K, 134C, 134M and 134Y positioned at one side of a black photosensitive drum 131K, a cyan photosensitive drum 131C, a magenta photosensitive drum 131M, a yellow photosensitive drum 131Y, all of which are arranged in a sub-scanning direction.

The plurality of focusing members 133K, 133C, 133M and 133Y are respectively disposed at reference positions Br1, Br2, Br3 and Br4 of laser beams which are scanned onto surfaces of the photosensitive drums 131K, 131C, 131M and 131Y.

Each of the plurality of focusing members 133K, 133C, 133M and 133Y has a right triangular cross section. A height of the right triangular cross section of each focusing member is equal to or larger than a diameter of each photosensitive drum. The reason why a shape of the focusing member is restricted is because, when the relative position between the laser scanning unit and the development unit is shifted from a normal reference position, a length of a trace of the laser beam of the horizontal synchronization signal passing through the focusing member is changed.

Figure 8:
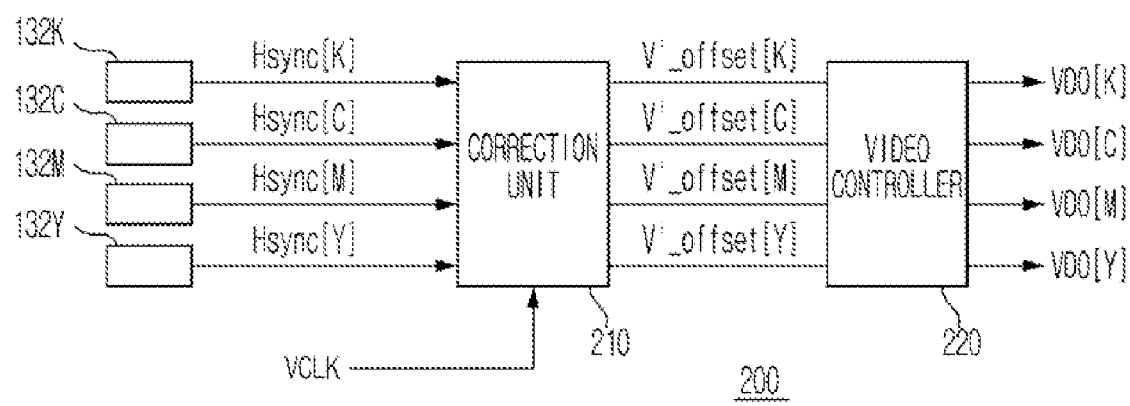
FIG. 8 is a block diagram of a multi-color image forming apparatus according to the embodiment of the present general inventive concept.

FIG. 8 is a block diagram illustrating the multi-color image forming apparatus according to an embodiment of the present general inventive concept. As illustrated, the multi-color image forming apparatus 200 includes a correction unit 210 and a video controller 220.

The black horizontal synchronization signal Hsync[K], cyan horizontal synchronization signal Hsync[C], magenta horizontal synchronization signal Hsync[M] and yellow horizontal synchronization signal Hsync[Y] output from the laser scanning units are respectively focused by the focusing members 133K, 133C, 133M and 133Y. Then, the horizontal synchronization signals are supplied to the correction unit 210 through the plurality of optical sensors 132K, 132C, 132M and 132Y.

The correction unit 210 receives the horizontal synchronization signals, counts the pulse widths of the horizontal synchronization signals using a video clock VCLK, determines whether predetermined vertical offsets are corrected according to the counted pulse widths, and provides the corrected vertical offsets to the video controller 220 after performing correction or provides the predetermined vertical offsets to the video controller 220 without correcting the vertical offsets, according to the determined result.

Whether the correction is performed, the video controller 220 generates and supplies video data corresponding to the respective colors, that is, black video data VDO[K], cyan video data VDO[C], magenta video data VDO[M] and yellow video data VDO[Y], to laser diodes of the respective laser scanning units, according to a black vertical offset V'_offset[K], a cyan vertical offset V'_offset[C], a magenta vertical offset V'_offset[M] and a yellow vertical offset V'_offset[Y] supplied from the correction unit 210. The laser diodes emit laser beams corresponding to the multi-color video data such that the light beams are scanned onto the surfaces of the photosensitive drums line by line.

Figure 9:
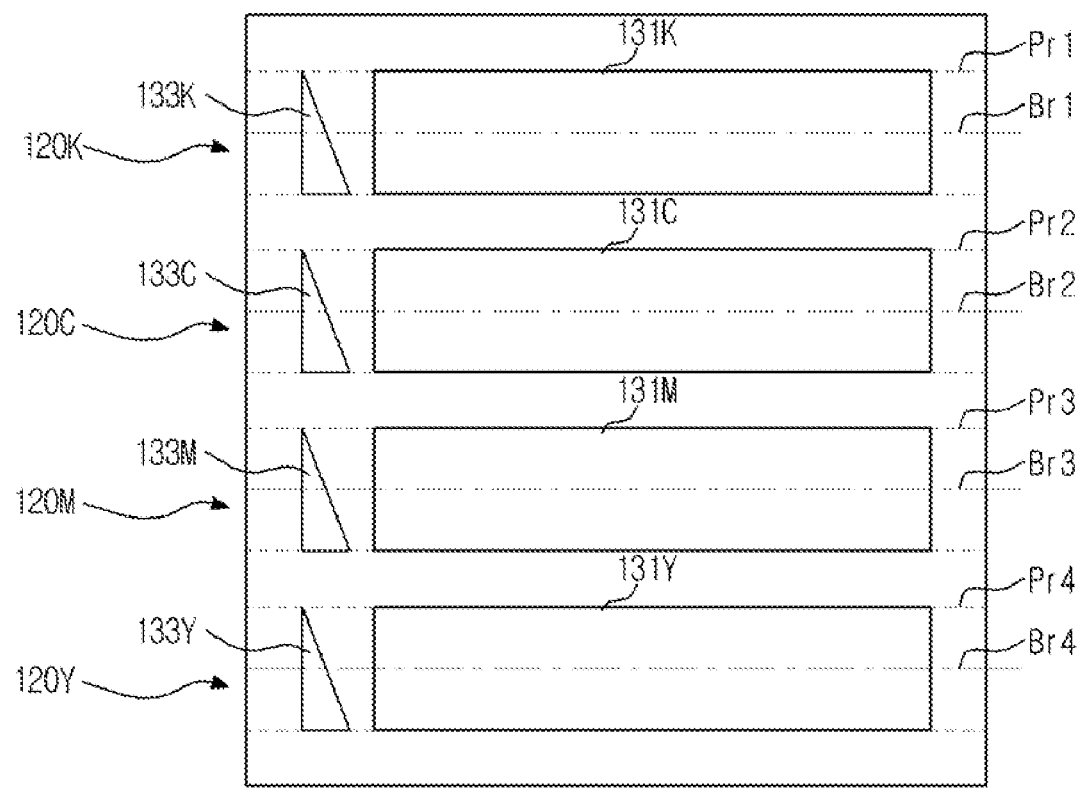
FIG. 9 is a view illustrating relative positions between laser scanning units and development units disposed at respective reference positions in the multi-color image forming apparatus according to an embodiment of the present general inventive concept.

FIG. 9 is a view illustrating an example of a case where the laser scanning units and the development units are normally disposed in the multi-color image forming apparatus according to an embodiment of the present general inventive concept.

Figure 3:
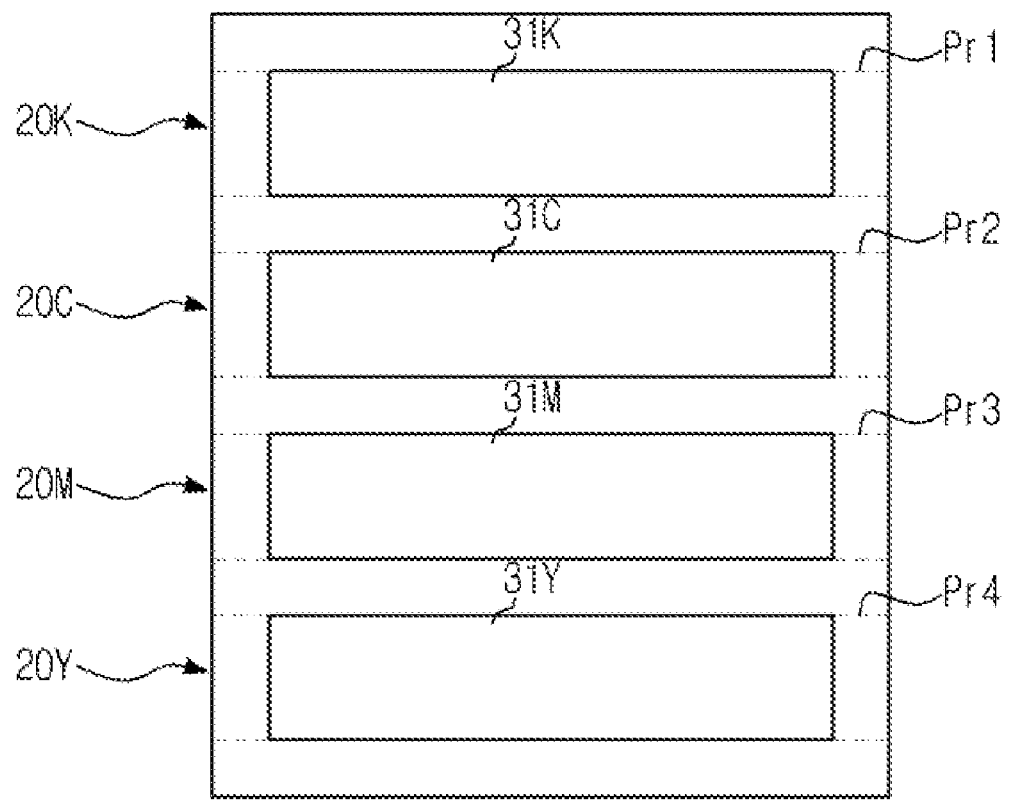
FIG. 3 is a view illustrating relative positions between a plurality of laser scanning units and a plurality of development units which are disposed corresponding to respective reference positions.
Figure 4:
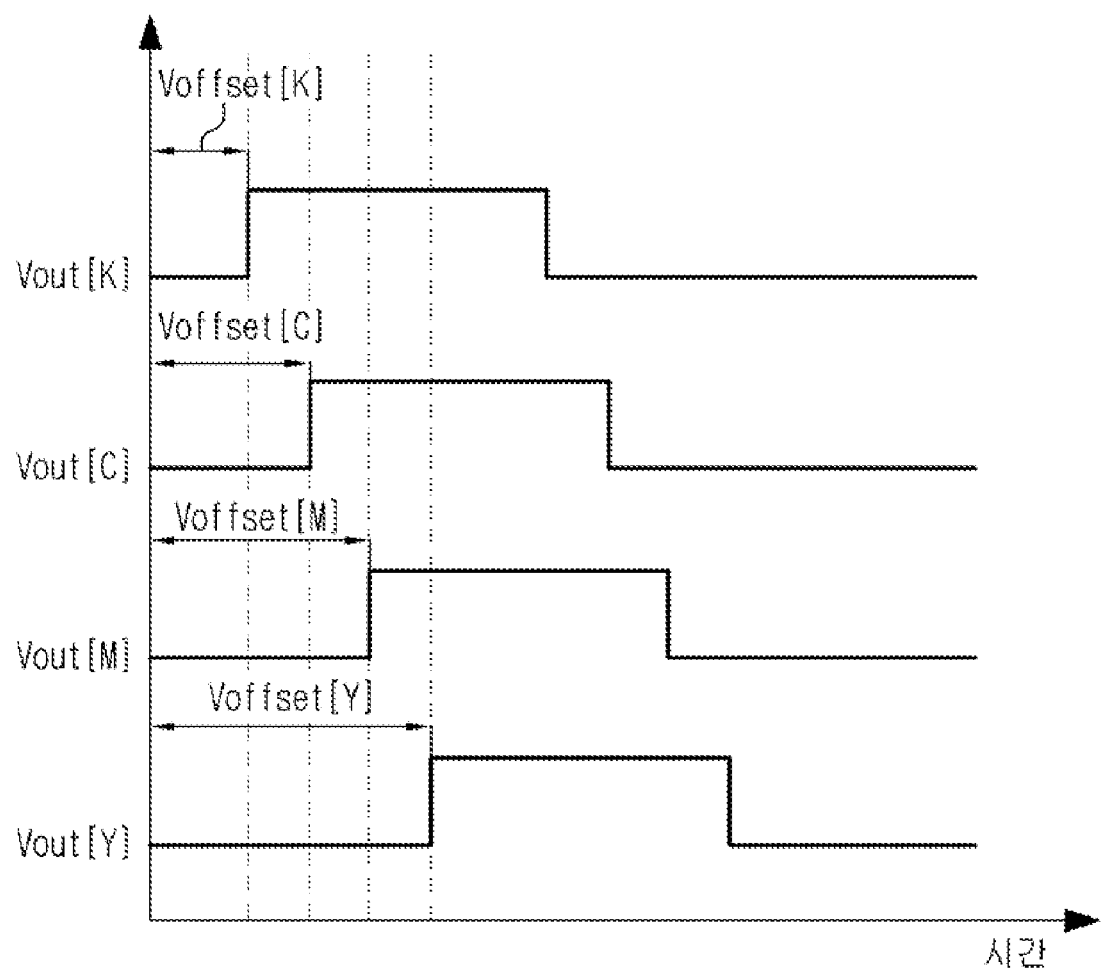
FIG. 4 is a view illustrating predetermined vertical offsets corresponding to respective colors.
Figure 5:
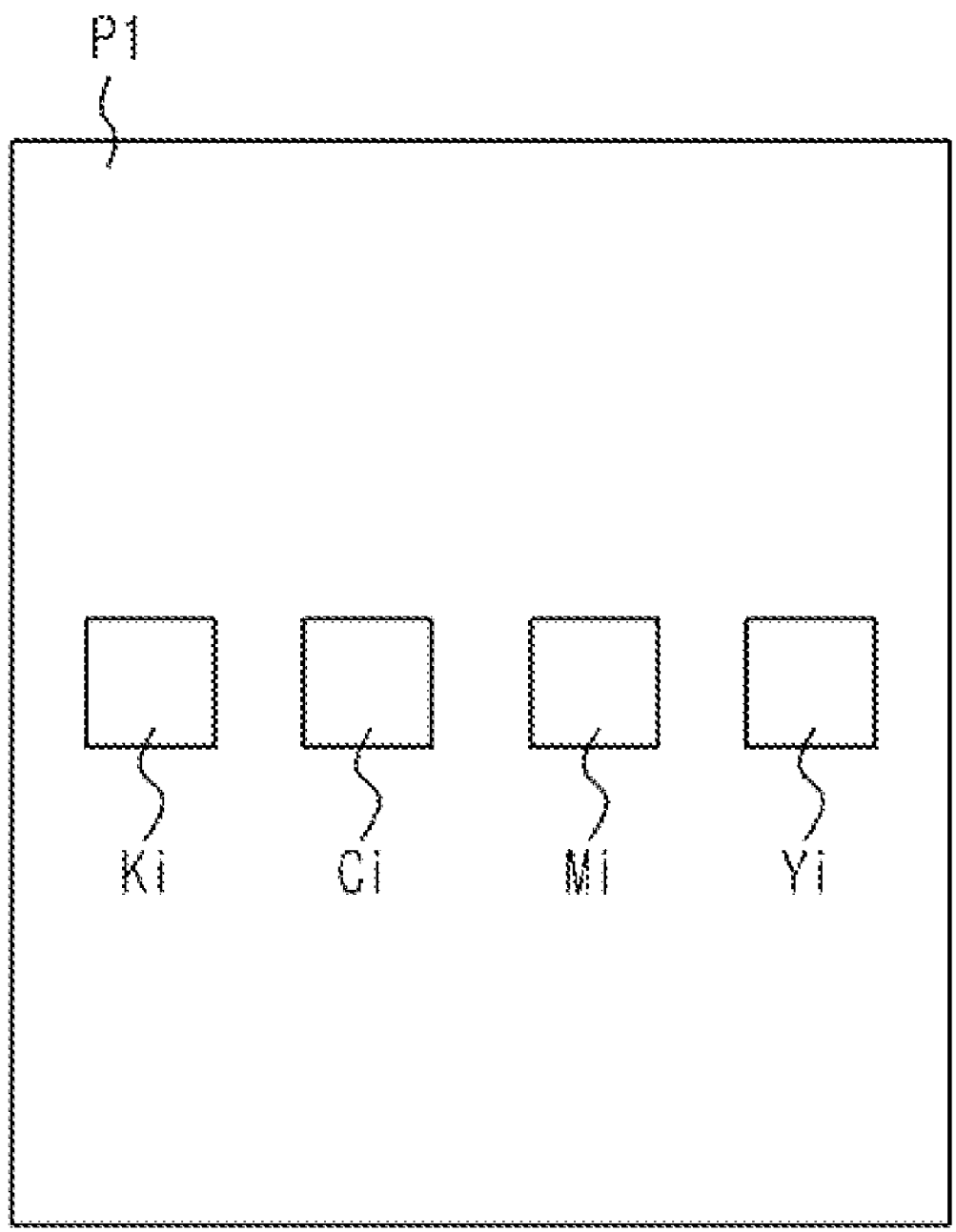
FIG. 5 is a view illustrating rectangular color images which are printed on a printing medium to be aligned in the vertical direction when the plurality of laser scanning units and the development units are disposed at the respective reference positions in FIG. 3.

The laser scanning units 120K, 120C, 120M and 120Y and the photosensitive drums 131K, 131C, 131M and 131Y of the plurality of development units are respectively disposed in correspondence with the reference positions Pr1, Pr2, Pr3 and Pr4, as illustrated in FIG. 3. The focusing members 133K, 133C, 133M and 133Y are respectively positioned at the scanning reference positions Br1, Br2, Br3 and Br4.

Figure 10:
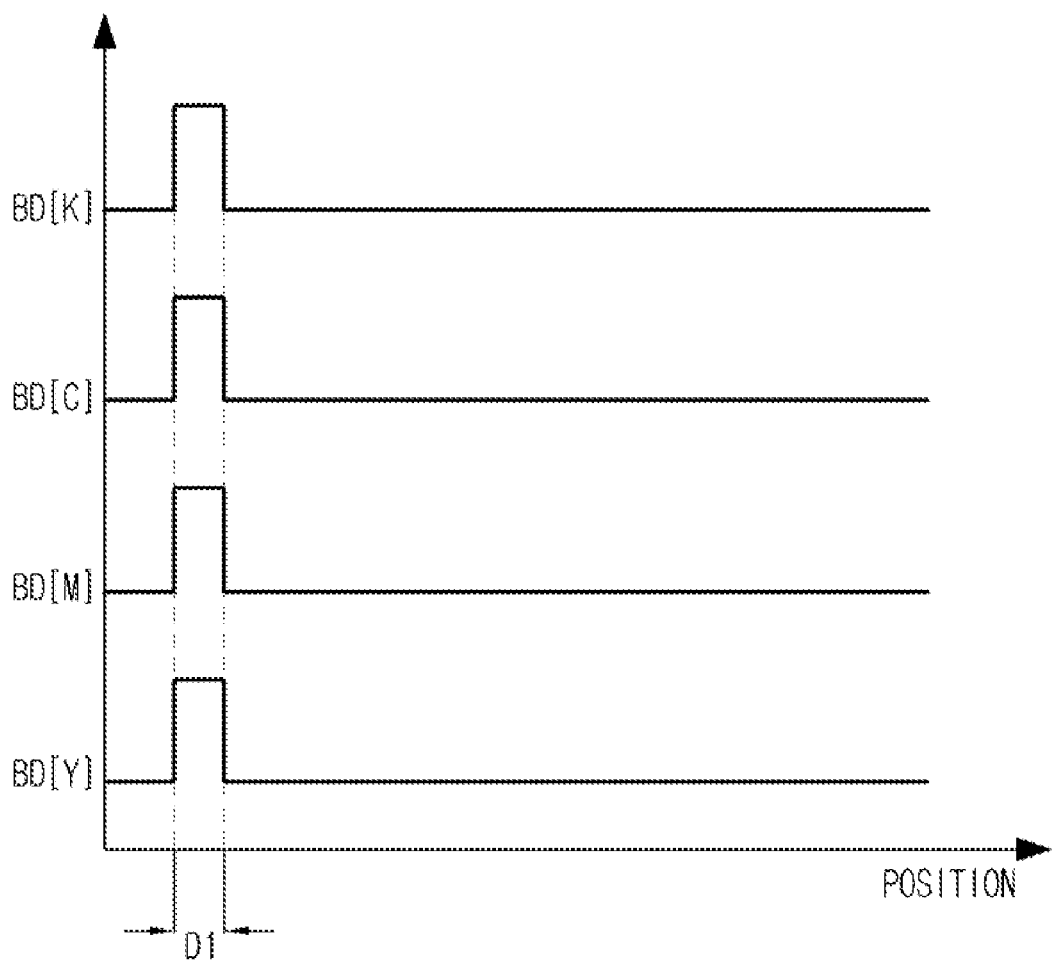
FIG. 10 is a view illustrating horizontal synchronization signals detected by optical sensors of the development units which are disposed at the respective reference positions of FIG. 9.

When the laser scanning units and the development units are normally disposed, the laser beams corresponding to the horizontal synchronization signals are respectively sent to predetermined positions of the focusing members. As the horizontal synchronization signals detected by the optical sensors 132K, 132C, 132M and 132Y, as illustrated in FIG. 10, a black horizontal synchronization signal BD[K], a cyan horizontal synchronization signal BD[C], a magenta horizontal synchronization signal BD[M] and a yellow horizontal synchronization signal BD[Y] each having a pulse width of a reference value D1 are generated.

When the pulse widths of the horizontal synchronization signals are constant, the correction is not required. Accordingly, the correction unit 210 supplies the predetermined vertical offsets to the video controller 220 and the video controller 220 outputs the video data corresponding to the respective colors through the laser diodes of the laser scanning units, in accordance with the received vertical offsets.

The relative positions between the laser scanning units and the development units may be changed due to alignment errors which occur when the laser scanning unit and the development units are disposed in the apparatus or due to a vibration of polygon mirrors during using the apparatus.

Figure 11:
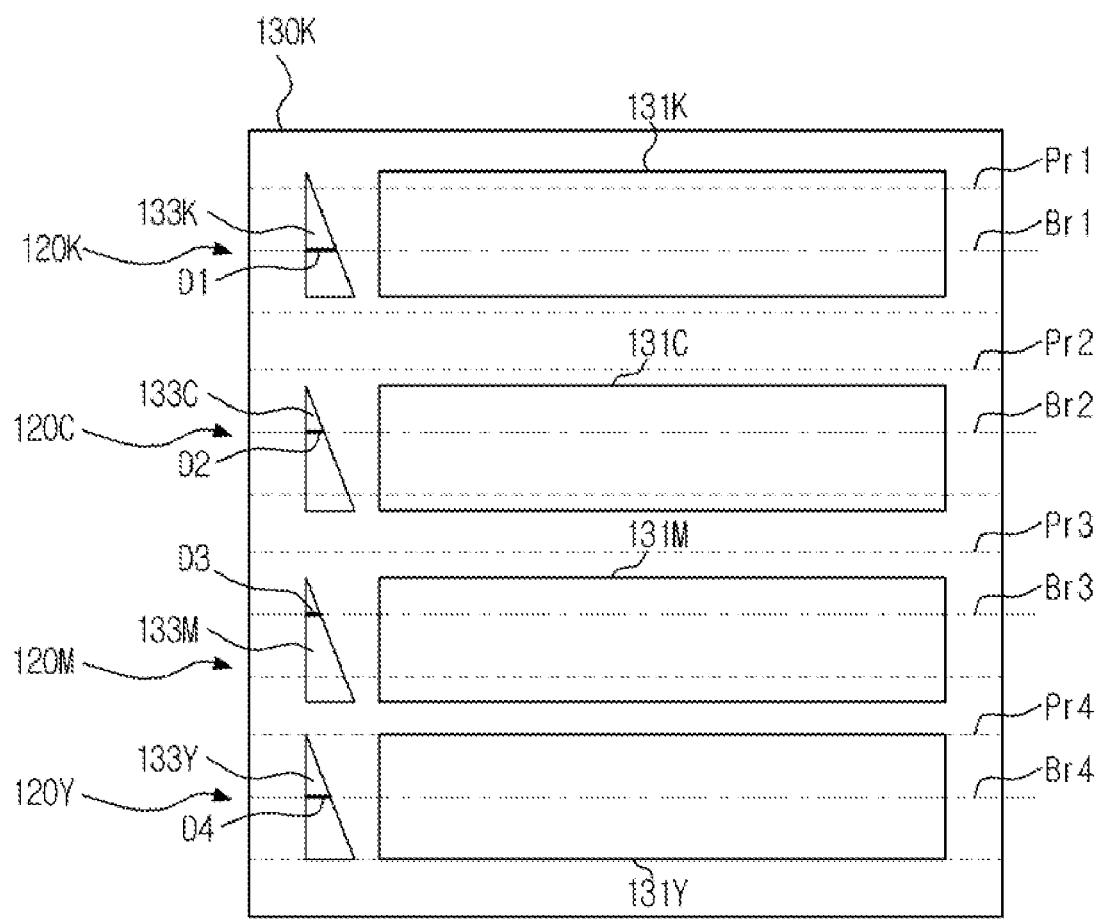
FIG. 11 is a view illustrating a state in which lengths of traces of the synchronization signals passing through focusing members are changed when the laser scanning units and the development units are disposed to be shifted from the respective reference positions of FIG. 9.

For example, as illustrated in FIG. 11, when the laser scanning units and the development units are disposed to be shifted in the vertical direction, the scanning positions of the surfaces of the photosensitive drums in the vertical direction become different from the reference scanning positions and thus the image quality deteriorates.

Figure 12:
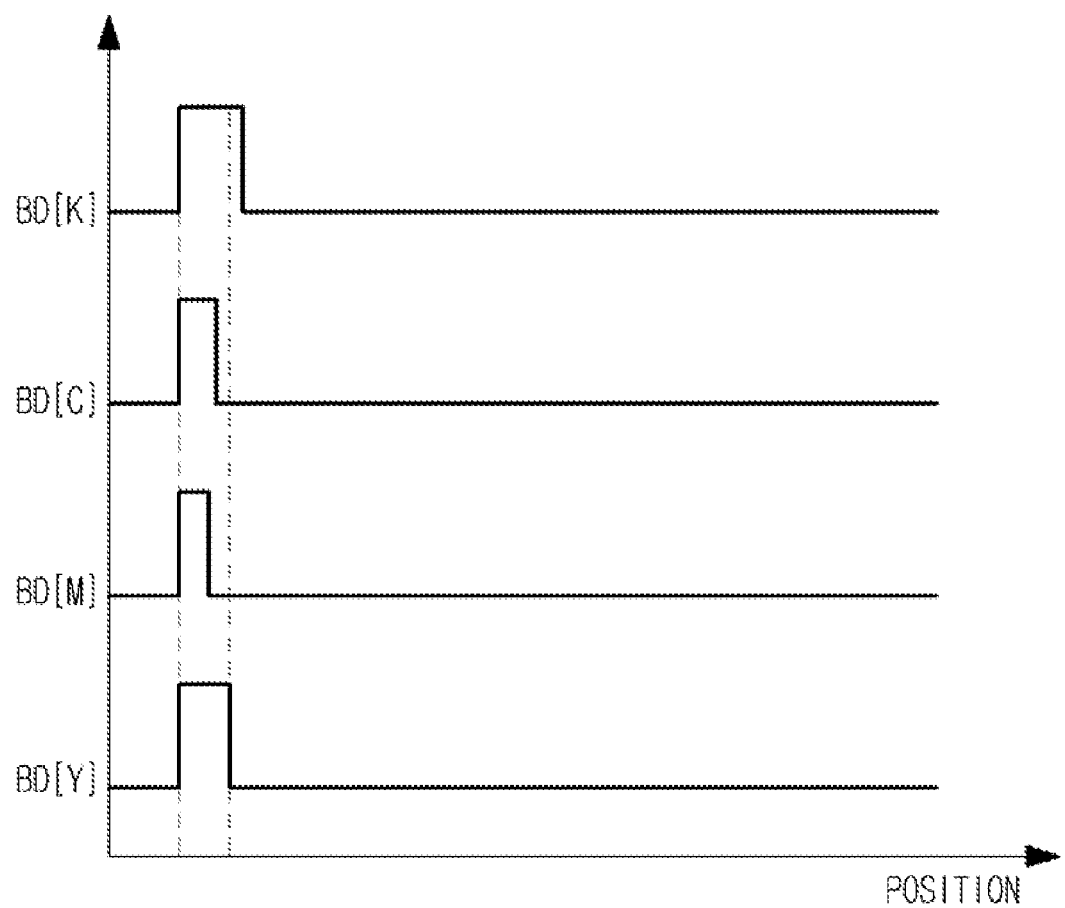
FIG. 12 is a view illustrating synchronization signals having pulse widths changed according to the lengths of the synchronization signals illustrated in FIG. 11.
Figure 13:
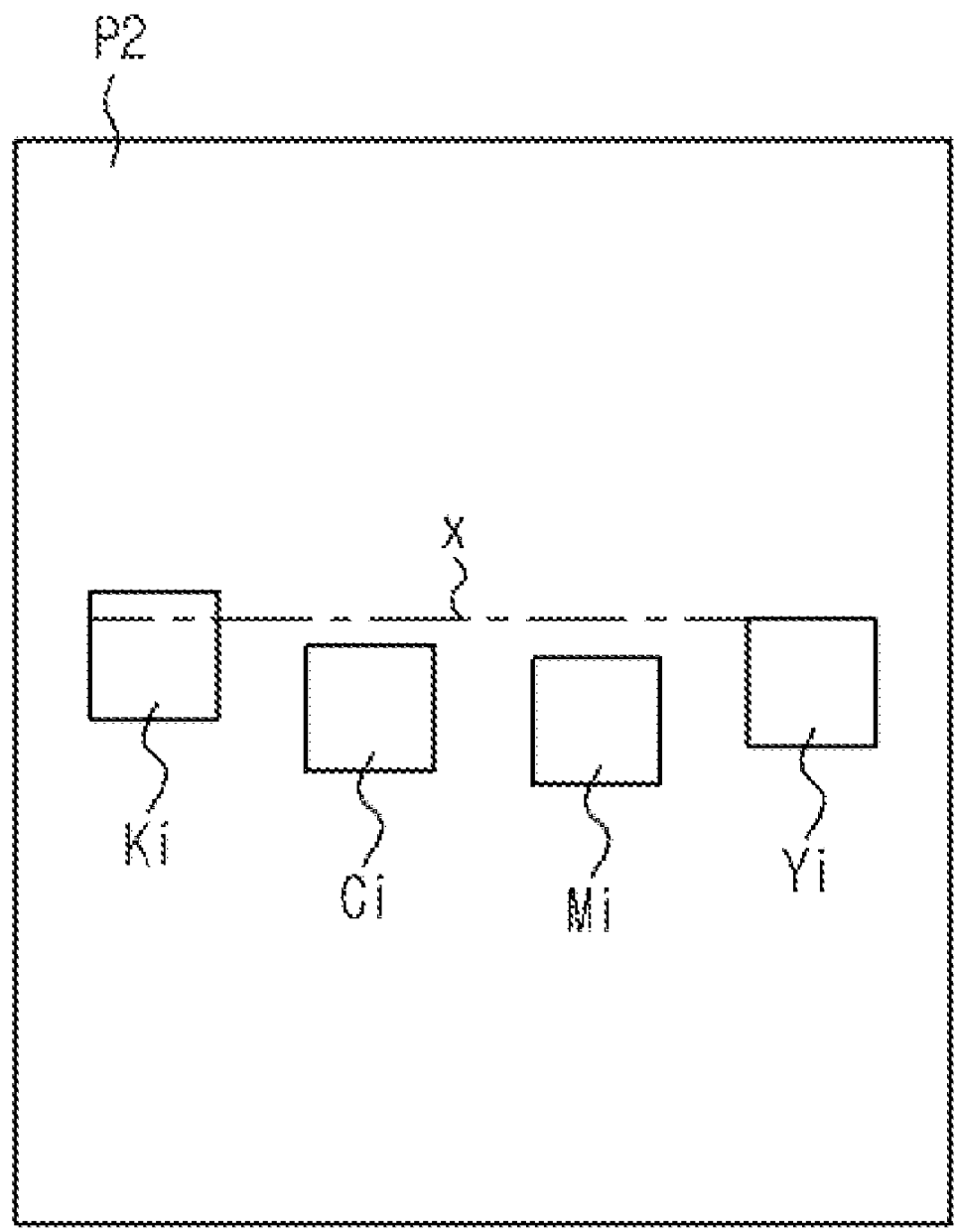
FIG. 13 is a view illustrating an example of a case where an alignment error occurs in a vertical direction when rectangular images are printed on a printing medium using predetermined vertical offsets in a state in which the laser scanning unit and the development units illustrated in FIG. 9 are disposed to be shifted from the respective reference positions.

In more detail, if the black photosensitive drum 131K corresponding to the black scanning unit 120K is disposed at a position higher than the reference position Pr1, the position of the focusing member 133K is higher than the scanning reference position Br1. Accordingly, the length of the trace D1 of the laser beam, which is output from the black scanning unit 120K as the horizontal synchronization signal, passing through the focusing member 133K is increased. Since a time necessary to input the light beam to the optical sensor 132K is increased by the increased length of the trace, the output signal of the sensor, that is, the pulse width of the black horizontal synchronization signal BD[K] supplied to the correction unit 210, becomes larger than the reference value D1, as illustrated in FIG. 12. In this case, if the printing operation is performed using the predetermined black vertical offset V'_offset[K], as illustrated in FIG. 13, the position of the black rectangular image Ki printed on the printing medium P2 is higher than the print reference position X.

Figure 14:
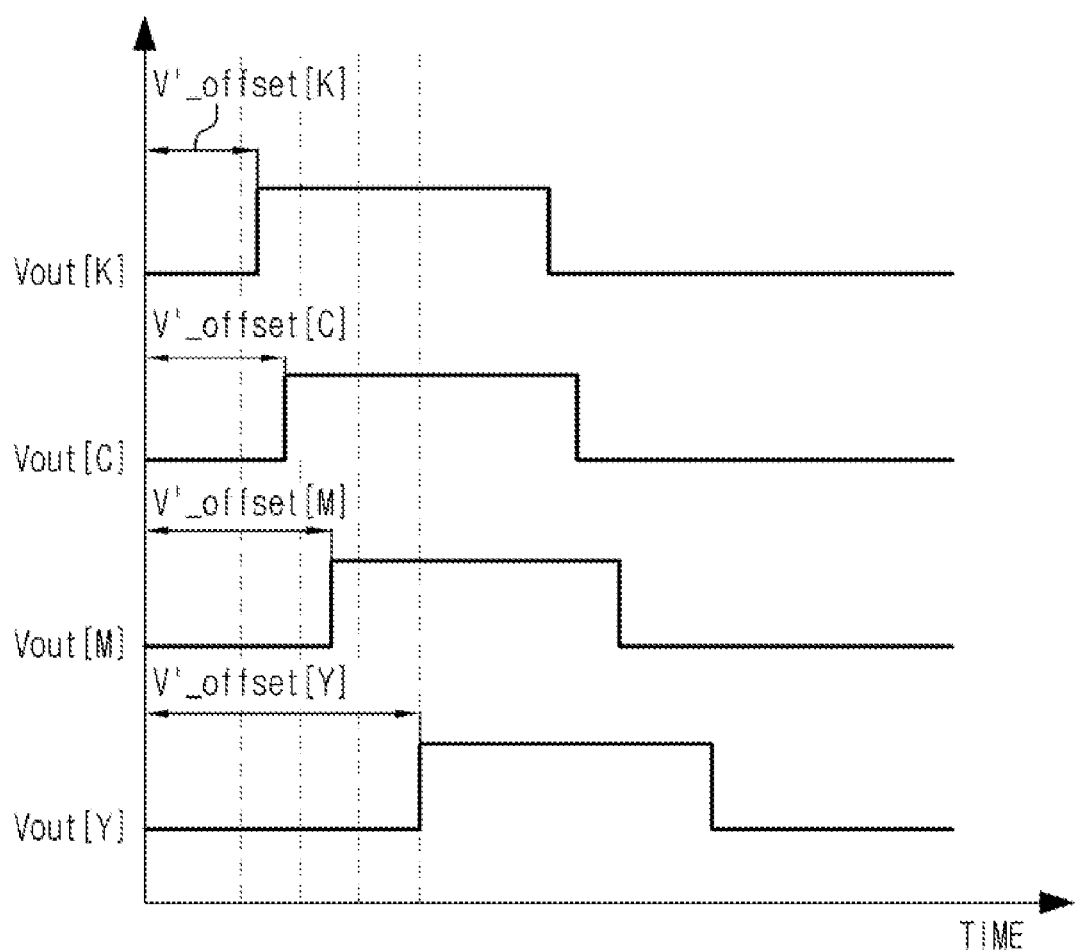
FIG. 14 is a view illustrating timings of the vertical offsets corrected by a correction unit according to lengths of pulse widths of the synchronization signals, according to an embodiment of the present general inventive concept.
Figure 15:
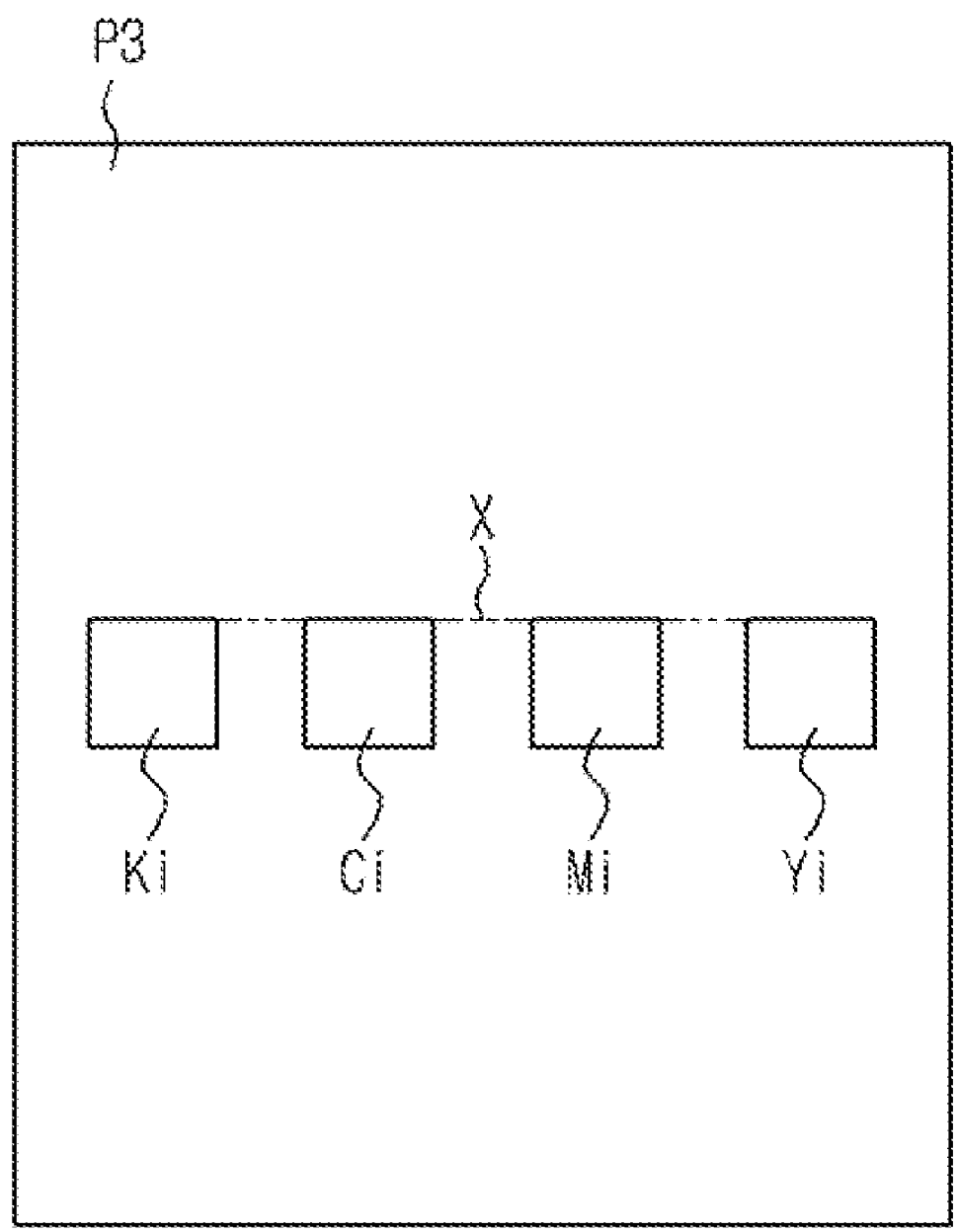
FIG. 15 is a view illustrating an example of a case where the rectangular color images are printed on the printing medium to be aligned in the vertical direction using the vertical offsets corrected by the correction unit, according to an embodiment of the present general inventive concept.

Referring to FIGS. 8 and 14, in order to correct the alignment error in the vertical direction the correction unit 210 increases the vertical offset and supplies the corrected black vertical offset V'_offset[K] to the video controller 220. When the video controller 220 outputs the video data VDO[K] according to the corrected black vertical offset V'_offset[K] and the printing operation is then performed, as illustrated in FIG. 15, the black rectangular image Ki printed on the printing medium P3 is shifted downward by the increased vertical offset and is aligned to the reference position X.

As another example, when the cyan and magenta photosensitive drums 131C and 131M corresponding to the cyan and magenta scanning units 120C and 120M are respectively positioned at positions lower than the reference positions Pr2 and Pr3, the positions of the focusing members 133C and 133M are lower than the scanning reference positions Br2 and Br3. Accordingly, the lengths of the traces D2 and D3 of the laser beams, which are respectively output from the cyan and magenta scanning units 120C and 120M as the horizontal synchronization signals, passing through the focusing members 133C and 133M are decreased. Here, the position of the magenta photosensitive drum 131M is lower than that of the cyan photosensitive drum 131C with respect to the respective reference positions, the length of the trace of the magenta laser beam is shorter than that of the cyan laser beam. Since a respective time necessary to input the respective light beams to the optical sensors 132C and 132M is decreased by the decreased lengths of the traces, the output signals of the sensors, that is, the pulse widths of the cyan and magenta horizontal synchronization signals BD[C] and BD[M] supplied to the correction unit 210, become smaller than the reference value D1, as illustrated in FIG. 12. Here, the position of the magenta photosensitive drum 131M is lower than that of the cyan photosensitive drum 131C with respect to the respective reference positions, the pulse width of the magenta laser beam is shorter than that of the cyan laser beam. In this case, if the printing operation is performed using the predetermined cyan and magenta vertical offset V'_offset[C] and V'_offset[M], as illustrated in FIG. 13, the positions of the cyan and magenta rectangular images Ci and Mi printed on the recording medium P2 are lower than the print reference position X.

Referring to FIGS. 8 and 14, in order to correct the alignment errors in the vertical direction, the correction unit 210 decreases the vertical offsets and supplies the corrected cyan and magenta vertical offsets V'_offset[C] and V]_offset[M] to the video controller 220. When the video controller 220 outputs the video data VDO[C] and VDO[M] according to the corrected cyan and magenta vertical offsets V'_offset[C] and V'_offset[M] and the printing operation is then performed, as illustrated in FIG. 15, the cyan and magenta rectangular images Ci and Mi printed on the printing medium P3 are shifted upward by the decreased vertical offsets and are aligned to the reference position X.

Finally, when the yellow photosensitive drum 131Y corresponding to the yellow scanning unit 120Y illustrated in FIG. 11 is normally disposed at the reference position Pr4, the trace D4 of the laser beam, which is output as the horizontal synchronization signal, passing through the focusing member 133Y corresponds to the reference value. Since the pulse width of the yellow horizontal synchronization signal BD[Y] corresponds to the reference value D1 as illustrated in FIG. 12, when the printing operation is performed using the predetermined yellow vertical offset V'_offset[Y], the yellow rectangular image Yi printed on the printing medium P2 is aligned to the printing reference position X, as illustrated in FIG. 13.

Hereinafter, a method of controlling the multi-color image forming apparatus according to an embodiment of the present general inventive concept will be described with reference to FIG. 16.

Figure 16:
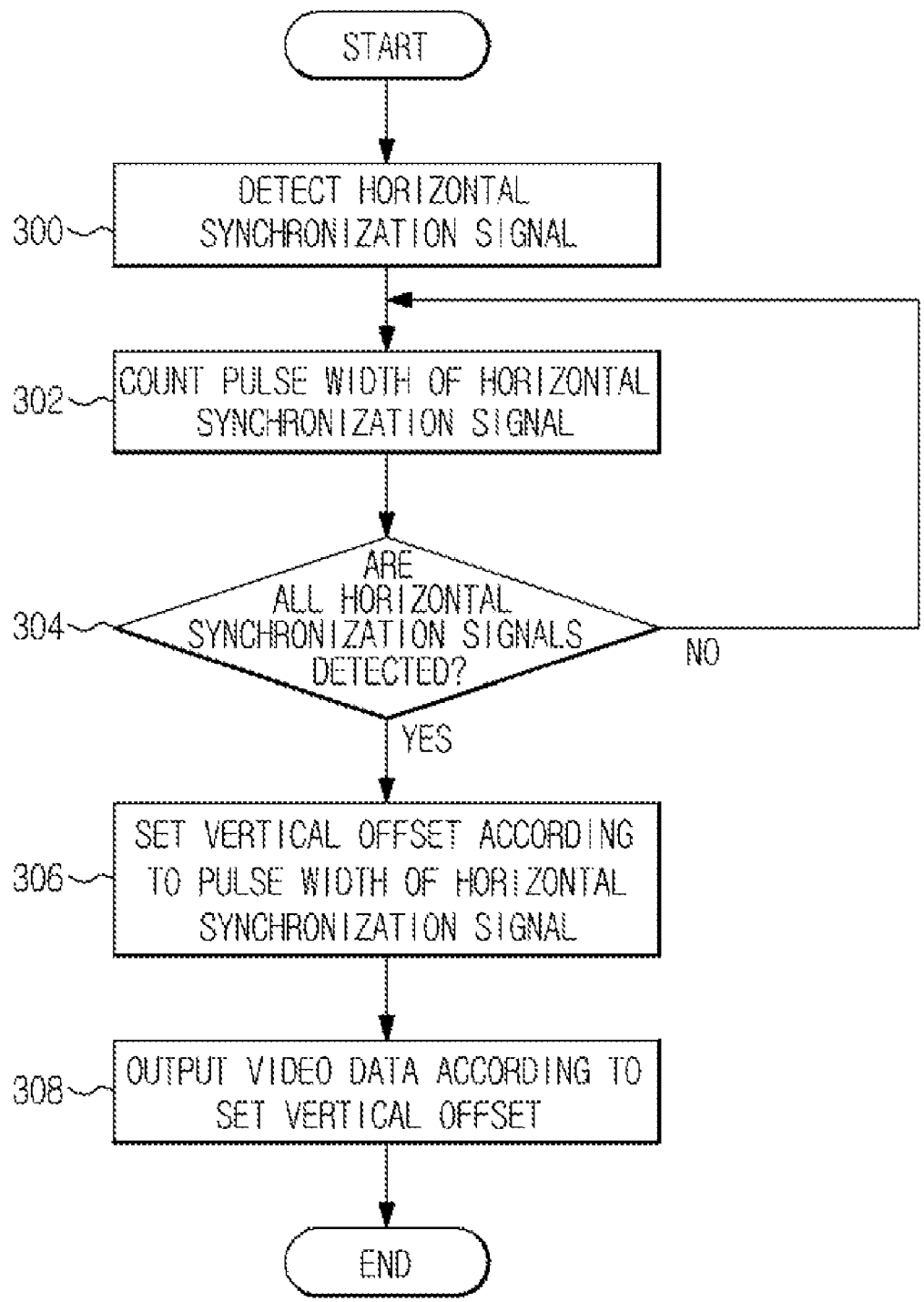
FIG. 16 is a flowchart illustrating a method of controlling the multi-color image forming apparatus according to an embodiment of the present general inventive concept.

Referring to FIGS. 9 and 16, the horizontal synchronization signals output from the laser scanning units 120K, 120C, 120M and 120Y are respectively output to the photosensitive drums 131K, 131C, 131M and 131Y of the development units.

The horizontal synchronization signals are sent to the focusing members 133K, 133C, 133M and 133Y. The optical sensors 132K, 132C, 132M and 132Y detect the respective horizontal synchronization signals focused by the focusing members and supply the horizontal synchronization signals to the correction unit 210. At this time, the pulse widths of the horizontal synchronization signals detected by the optical sensors are respectively determined according to the lengths of the traces of the laser beams of the horizontal synchronization signals passing through the focusing members 133K, 133C, 133M and 133Y (operation 300).

The correction unit 210 counts the pulse widths of the horizontal synchronization signals (operation 302). Then, a determination is made whether all the pulse widths of the horizontal synchronization signals are counted (operation 304).

If a determination is made that all the horizontal synchronization signals are not detected, then the method progresses to Operation 302. If a determination is made that all the horizontal synchronization signals are detected, then the predetermined vertical offset is corrected to be increased or decreased according to the counted pulse width of the horizontal synchronization signal (operation 306).

Then, the video controller 220 outputs the video data according to the vertical offset set by the correction such that an image is printed on a printing medium.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A multi-color image forming apparatus including a plurality of laser scanning units and a plurality of development units, the apparatus comprising:
   focusing members which are provided in the development units in correspondence with the laser scanning units and focus laser beams corresponding to horizontal synchronization signals output from the laser scanning units;

optical sensors to vary pulse widths of the horizontal synchronization signals according to lengths of traces of the synchronization signals passing through the focusing members;

a correction unit to correct timings of vertical offsets so as to correct alignment errors of the laser scanning units and the development units in a vertical direction according to lengths of the pulse widths of the horizontal synchronization signals of the optical sensors; and a video controller to output video data to scan an image according to the timings of the vertical offsets corrected by the correction unit.

2. The method of claim 1, wherein the video controller outputs the video data according to the corrected timings of the vertical offsets so as to align multi-color images to reference positions of a printing medium.

3. The method of claim 1, wherein the focusing members are disposed at one side of photosensitive drums in a line and have right triangular cross-sections, and heights of the right triangular cross-sections are equal to or larger than diameters of the photosensitive drums.

4. The multi-color image forming apparatus according to claim 1, wherein the synchronization signals output from the plurality of laser scanning units are horizontal synchronization signals for synchronization purposes before the scanning of a line.

5. A method of controlling a multi-color image forming apparatus including a plurality of laser scanning units and a plurality of development units in order to print a multi-color image, the plurality of development units including focusing members to focus laser beams corresponding to horizontal synchronization signals outputted from the laser scanning units and optical sensors to output the horizontal synchronization signals, the pulse widths of which are changed according to the lengths of traces of the laser beams passing through the focusing members, the method comprising:

detecting the lengths of the traces of the horizontal synchronization signals sent from the plurality of laser scanning units to the optical sensors through the focusing members;

determining whether the pulse widths of the horizontal synchronization signals are changed based on the detected lengths of the traces of the horizontal synchronization signals;

correcting timings of vertical offsets so as to correct alignment errors of the plurality of laser scanning units and the plurality of development units in a vertical direction based on the change in the pulse widths of the horizontal synchronization signals if the pulse widths of the horizontal synchronization signals are changed; and outputting video data to scan the multi-color image based on the corrected timings of the vertical offsets.

6. The method according to claim 5, wherein the correcting of the timings of the vertical offsets comprises:

increasing the timings of the vertical offsets if the pulse widths of the horizontal synchronization signals are greater than a reference pulse width of a reference horizontal synchronization signal; and decreasing the timings of the vertical offsets if the pulse widths of the horizontal synchronization signals are less than the reference pulse width of the reference horizontal synchronization signal.

7. A computer-readable recording medium having embodied thereon a computer program to execute a method of controlling a multi-color image forming apparatus including a plurality of laser scanning units and a plurality of development units in order to print a multi-color image, the plurality of development units including focusing members to focus laser beams corresponding to horizontal synchronization signals, the pulse widths of which are changed according to the lengths of traces of the laser beams passing through the focusing members, wherein the method comprises:

detecting the lengths of the traces of the horizontal synchronization signals sent from the plurality of laser scanning units to the optical sensors through the focusing members;

determining whether the pulse widths of the horizontal synchronization signals are changed based on the detected lengths of the traces of the horizontal synchronization signals;

correcting timings of vertical offsets so as to correct alignment errors of the plurality of laser scanning units and the plurality of development units in a vertical direction based on the change in the pulse widths of the horizontal synchronization signals if the pulse widths of the horizontal synchronization signals are changed; and outputting video data to scan the multi-color image based on the corrected vertical offsets.

* * * * *